Figure 1:
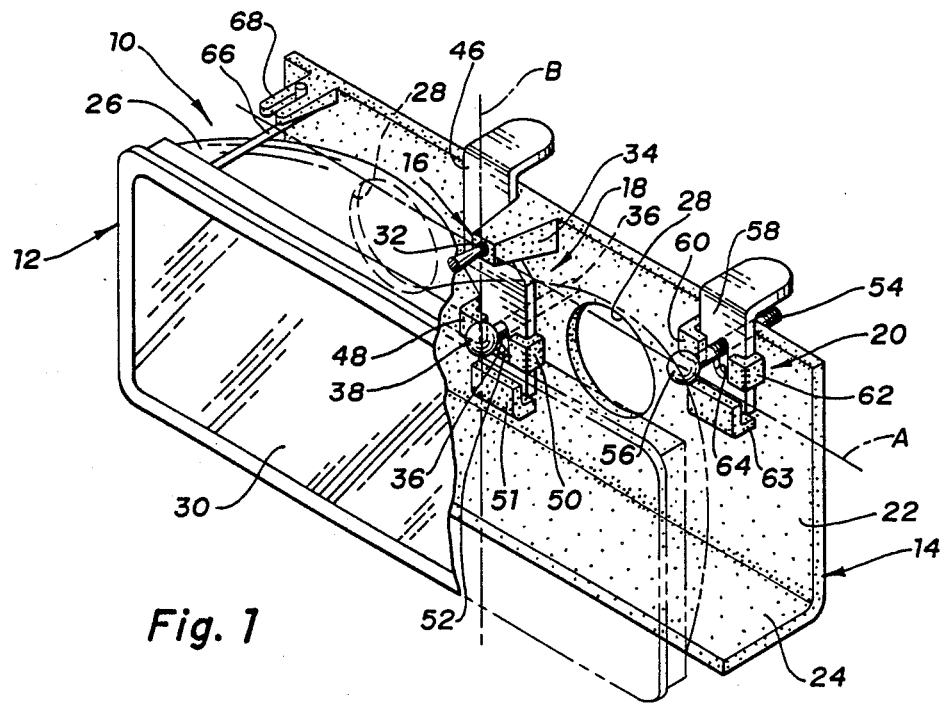

United States Patent [19]
DePetro

[11] Patent Number: 4,901,208
[45] Date of Patent: Feb. 13, 1990

[54] HEADLAMP ASSEMBLY

[75] Inventor: Gerald R. DePetro, Port Charlotte, Fla.

[73] Assignee: General Motors Corporation, Detroit, Mich.

[21] Appl. No.: 306,120

[22] Filed: Feb. 6, 1989

[51] Int. Cl.$^4$ ............................................. B60Q 1/06
[52] U.S. Cl. ..................,............................. 362/66; 362/70; 362/419; 362/424
[58] Field of Search ...................... 362/66, 67, 70, 287, 362/419, 424, 428, 421

[56] References Cited

U.S. PATENT DOCUMENTS

| | | | |
|---|---|---|---|
| 2,212,048 | 8/1940 | Russell | 362/424 |
| 2,947,856 | 8/1960 | Fox | 362/424 |
| 4,621,307 | 11/1986 | Lieber | 362/66 |
| 4,689,725 | 8/1987 | Saijo et al. | 362/66 |

Primary Examiner—Ira S. Lazarus
Assistant Examiner—Richard R. Cole
Attorney, Agent, or Firm—Edward J. Biskup

[57] ABSTRACT

A headlamp assembly in which the lamp body is connected to a support panel by three ball pivots, two of which are formed with a shaft portion which cooperates with a finger-operated slide for allowing adjustment of the lamp body about a horizontal aim axis and a vertical aim axis without the use of a tool.

3 Claims, 1 Drawing Sheet

U.S. Patent   Feb. 13, 1990   4,901,208

HEADLAMP ASSEMBLY

This invention concerns vehicle headlamps in general, and more particularly relates to composite headlamps normally incorporated in the front end of a motor vehicle.

More specifically, the present invention concerns a headlamp assembly mountable to a support panel at the front end of a motor vehicle and which does not require any form of tool to achieve selective adjustable movement of the lamp body about a vertical aim axis and a horizontal aim axis. In the preferred form, the headlamp assembly includes a rigid ball stud member between the support bracket and the lamp body for supporting the latter for universal pivotal movement relative to the support panel with the center of the ball portion of the ball stud member being located at the intersection of the horizontal aim axis and the vertical aim axis. A first adjustable member, in the form of an elongated shaft, has a first ball pivot formed at one end of the shaft and has the other end of the shaft extending through a first opening in the support panel for longitudinal adjustable movement relative thereto. A second adjustable member, also in the form of an elongated shaft, has a second ball pivot formed at one end of the shaft and has the other end of the shaft extending through a second opening in the support panel spaced from the first opening for adjustable longitudinal movement relative thereto. The first ball pivot is attached to the lamp body with the center thereof being located along the vertical aim axis while the second ball pivot is attached to the lamp body with the center thereof being located along the horizontal aim axis. The portion of each shaft of the first and second adjustable members that extends through the opening of the support panel is formed with a plurality of axially space stops which cooperate with a vertically movable finger-operated slide member carried by the support panel. The arrangement is such that when the slide member is moved upwardly away from the associated shaft, the lamp body can be adjusted about one of the aim axes. After the lamp assumes the desired adjusted position, the slide member is moved downwardly towards the associated shaft to engage one of the stops and thereby lock the lamp body in a fixed position relative to the support panel.

The objects of the present invention are to provide a new and improved headlamp assembly that includes finger-operated slide members which allow the lamp body to be readily adjusted in position about a vertical aim axis and a horizontal aim axis; to provide a new and improved headlamp assembly in which the lamp body is connected to a support panel by three ball pivots, two of which are formed with elongated shaft portions which cooperate with finger-operated slides for permitting adjustment of the lamp body about a horizontal aim axis and a vertical aim axis; to provide a new and improved headlamp assembly in which the headlamp is mounted to a support panel fixed at the front end of a vehicle through a three-point suspension that includes two longitudinally adjustable shafts, each of which is formed with a plurality of axially spaced stops that cooperate with fingeroperated slides carried by the support panel for locking the headlamp in an adjusted position; and to provide a new and improved headlamp assembly that includes a lamp body which is selectively adjustable about a vertical aim axis and a horizontal aim axis through a pair of adjustment mechanisms which do not require the use of any form of tool, and in which each adjustment mechanism includes a longitudinally adjustable shaft having a plurality of axially spaced annular grooves formed thereon for cooperation with a finger-operated slide accessible from above the headlamp assembly for locking the associated shaft in position after the lamp body is adjusted about one of the aim axes.

Figures 2, 3:
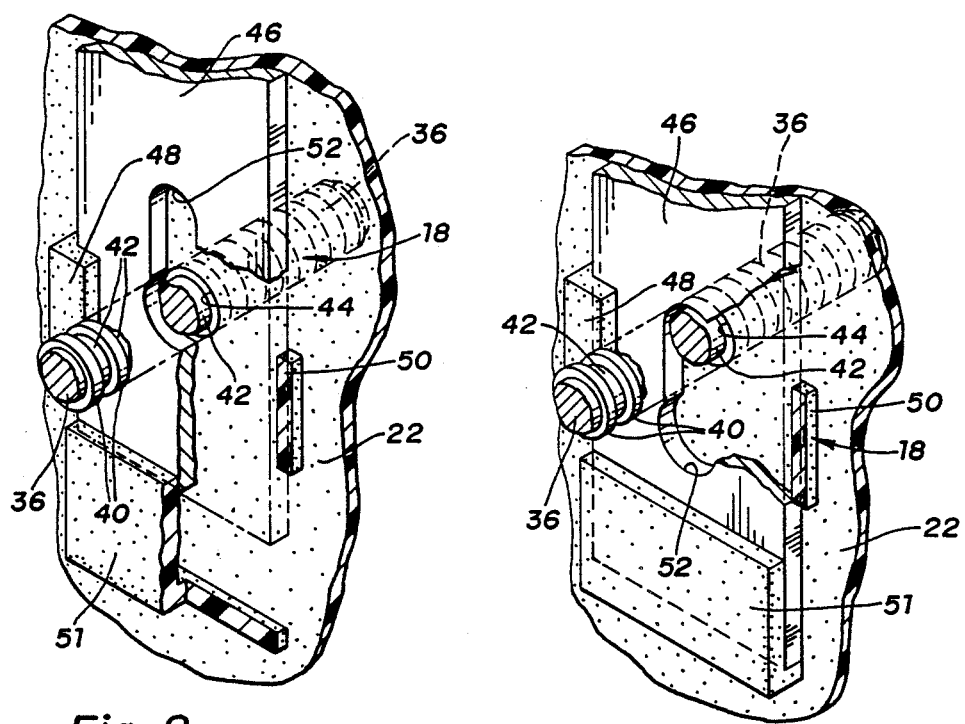

Other objects, features and advantages of the present invention will be apparent from the following detailed description when taken with the drawings in which FIG. 1 is a perspective view of a headlamp assembly made in accordance with the present invention;

FIG. 2 is an enlarged perspective view of the shaft portion of one of the adjustment mechanisms incorporated with the headlamp assembly of FIG. 1 and illustrates the position of the slide member when the adjustment mechanism is in the unlocked position; and FIG. 3 is a view similar to that seen in FIG. 2 but shows the portion of the slide member when it is located in the locked position.

Referring now to the drawings, and more particularly FIG. 1 thereof, a headlamp assembly is shown of the replaceable light bulb composite type made according to the present invention. The headlamp assembly 10 includes a lamp body 12 which is connected to a support bracket by a ball stud member and a pair of adjustment mechanisms 18 and 20 for selective adjustable positioning of the lamp body 12 about a horizontal aim axis A and a vertical aim axis B. The headlamp assembly 10 is intended to be shipped as a unit to a vehicle manufacturer and thereafter is mounted to a support panel at the front end of a motor vehicle so as to permit adjustable movement of lamp body 12 in a horizontal plane containing the horizontal aim axis A and in a vertical plane containing the vertical aim axis B.

The support bracket 14 is generally of a L-shape and is made of a plastic material or the like. The support bracket 14 is adapted to be fastened to the sheet metal structure (not shown) at the front portion of the vehicle and includes a vertically orientated back wall 22 integrally formed with a bottom wall 24 that is located in a horizontal plane.

The lamp body 12 includes a plastic reflector member 26 formed with a pair of side-by-side parabolic cavities, the inner concave surfaces of each of which is aluminized so as to project a light beam forwardly of the motor vehicle. The rear of each of the parabolic cavities is provided with a centrally located circular opening which is combined with a retainer (not shown) such as seen in U.S. Pat. No. 4,747,029 issued May 24, 1988 that receives a replaceable light bulb (also not shown), the filament of which is suitably located relative to the associated parabolic reflective surface so as to project the desired beam of light forwardly of the vehicle.

The front of the reflector member 26 is closed by a glass or plastic lens 30, the rear marginal portion of which is bonded to the reflector member 26. The rear portion of the reflector member 26 has the ball stud member 16 rigidly connected thereto at an upper portion of the reflector member 26 and at a location substantially midway between the parabolic cavities. The ball portion 32 of the ball stud member 16 is received within a socket formed in a boss 34 fixed to the upper portion of the support bracket 14. Below the ball stud member 16 is a shaft 36, the front end of which is formed with a ball pivot 38. The ball pivot 38 is connected to the lower rear of the reflector member through a plastic socket member (not shown), such as seen in U.S. Pat. No. 4,742,435 dated May 3, 1988 and assigned to the assignee of this invention. It will be noted that the center of the ball portion 32 of ball stud member 16 and the center of the ball pivot 38 are located along the vertical aim axis B, thus allowing the lamp body 12 to be adjusted about the aim axis B in a manner to be described. It will also be notd that substantially the entire length of the shaft 36 is formed with a plurality of axially spaced stops which take the form of a plurality of ring-like collars 40 of the same diametric size between each adjacent pair of which is an annular groove 42. The rear end of the shaft 36 forms one part of the adjustment mechanism 18 and extends through a circular opening 44 having a diameter essentially the same as the major diameter of the shaft 36 and firmed in the back wall 22 of the support bracket 14. The shaft 36 cooperates with a finger-operated slide member 46 which forms another part of the adjustment mechanism 18 and is supported and guided by arms 48, 50 and 51 fixed to the support bracket 14 for vertical movement between a raised unlocked position as seen in FIG. 2 and a lowered locked position as seen in FIG. 3. The shaft 36 extends through an inverted keyhole-shaped opening 52 so when the slide member 46 is in the raised position of FIG. 2, the shaft 36 is located in the enlarged circular portion of the opening 52 and the shaft 36 is movable longitudinally relative to support bracket. When the slide member 46 is moved to the lowered position of FIG. 3, the narrow portion of the opening 52, which has a width dimension essentially the same as the minor diameter of the shaft 36 at the annular groove 42, moves into a groove 42 between a pair of collars 40 and locks the shaft 36 to the support bracket 14 thereby preventing any longitudinal movement of the shaft 36.

The adjustment mechanism 20 is identical in construction to the adjustment mechanism 18 described above. Thus, as seen in FIG. 1, an elongated shaft 54 is provided the front end of which is formed with a ball pivot 56 which is received for relative pivotal movement by a similar plastic socket (not shown) attached to the rear of the reflector member 12 at an upper portion thereof and spaced horizontally from the ball stud member 16. In this regard, it will be noted that the center of the ball pivot 56 is located along the horizontal aim axis, thus allowing the lamp body 12 to be adjusted about the horizontal aim axis A when the adjustment mechanism 18 is in the unlocked state. As in the case of the aforementioned shaft 36, essentially tne entire length of shaft 54 is formed with a plurality of axially spaced stops which also take the form of a plurality of ring-like collars, each adjacent pair of which are separated by an annular groove as seen in FIG. 2. Also, the shaft 54 extends through a circular opening in the back wall such as opening 44 as seen in FIG. 2 and cooperates with a similar slide member 58 supported by arms 60, 62 and 63 on the back wall 22 for vertical movement between a raised unlocked position and a lowered locked position. The slide member 58 is also formed with an inverted keyhole-shaped opening 64 through which the shaft 54 extends so when the slide member 58 is in the lowered position of FIG. 1, the shaft 54 is locked to the support bracket 14. However, when the slide member 58 is raised so that the enlarged circular portion of the opening 64 surrounds the shaft 54 as seen in FIG. 2, the shaft 54 is movable longitudinally relative to the support bracket 14. It will also be noted that an L-shaped guide rod 66 is attached to the rear of the reflector member 26 and has its free end located in a clevis member 68 formed integrally with the back wall 22. Although not necessary to practice the invention, the guide rod and clevis arrangement cooperate with the ball stud member 16 and the adjustment mechanisms 18 and 20 for providing additional support and stability to the lamp body 12 when the latter is being adjusted about either the horizontal aim axis A or vertical aim axis B.

It should be apparent from the above description that when the slide members 46 and 58 of the adjustment mechanisms 18 and 20 respectively are in the lowered locked position of FIG. 1, the lamp body 12 is in a fixed position and cannot be moved about either of the aim axes A or B relative to the support bracket 14. If, however, it should be desired to adjust the lamp body 12 about the vertical aim axis B, the slide member 58 will be raised manually so as to position the enlarged circular portion of the opening 64 adjacent to the shaft 54 as seen in FIG. 2. This movement frees the shaft 54 and allows longitudinal movement thereof and accordingly allows movement of the lamp body about the vertical aim axis B. Similarly, if it should be desired to adjust the position of the lamp body 12 about the horizontal aim axis A, it is only necessary to raise the slide member 46 of the adjustment mechanism 18 so as to release the associated shaft 36 from the locked position of FIG. 1. Once the lamp body 12 is properly adjusted, the slide member 46 is returned to the lowered position to once again lock the associated shaft 36 to the support bracket 14.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. The combination with a headlamp assembly adapted to be mounted to a support panel at the front end of a motor vehicle so as to allow selected adjustable movement of a lamp body about a vertical aim axis and a horizontal aim axis, a rigid ball stud member located between said support panel and said lamp body for supporting the latter for universal pivotal movement relative to said support panel and having the center thereof located at the intersection of said horizontal aim axis and said vertical aim axis, a first longitudinally adjustable member having a first ball pivot formed at one end thereof and having the other end extending through a first opening in said support panel for adjustable movement relative thereto, a second longitudinally adjustable member having a second ball pivot formed at one end thereof and having the other end extending through a second opening in said support panel for adjustable movement relative thereto, said first ball member being attached to said lamp body with the center of said first ball member located along said vertical aim axis, said second ball member being attached to said lamp body with the center of said second ball member located along said horizontal axis, each of said first and second longitudinally adjustable members being formed with a plurality of axially spaced stops, and a finger-operated locking member slidingly carried by said support panel adjacent each of said first and second longitudinally adjustable members for engaging said stops thereon for locking the associated adjustable member to said support panel after said lamp body is properly adjusted about one of said aim axes.

2. The combination with a headlamp assembly adapted to be mounted to a support panel at the front end of a motor vehicle so as to allow selected adjustable movement of a lamp body about a vertical aim axis and a horizontal aim axis, a rigid ball stud member located between said support panel and said lamp body for supporting the latter for universal pivotal movement relative to said support panel and having the center thereof located at the intersection of said horizontal aim axis and said vertical aim axis, a first longitudinally adjustable shaft having a first ball pivot formed at one end thereof and having the other end extending through a first opening in said support panel for adjustable movement relative thereto, a second longitudinally adjustable shaft having a second ball pivot formed at one end thereof and having the other end extending through a second opening in said support panel for adjustable movement relative thereto, said first ball member being attached to said lamp body with the center of said first ball member located along said vertical aim axis, said second ball member being attached to said lamp body with the center of said second ball member located along said horizontal axis, each of said first and second longitudinally adjustable shafts being formed with a plurality of axially spaced stops, and a vertically movable finger-operated locking member slidingly carried by said support panel adjacent each of said first and second longitudinally adjustable shafts for engaging said stops thereon for locking the associated shaft to said support panel after said lamp body is properly adjusted about one of said aim axes.

3. The combination with a headlamp assembly adapted to be mounted to a support panel at the front end of a motor vehicle so as to allow selected adjustable movement of a lamp body about a vertical aim axis and a horizontal aim axis, a rigid ball stud member located between said support panel and said lamp body for supporting the latter for universal pivotal movement relative to said support panel and having the center thereof located at the intersection of said horizontal aim axis and said vertical aim axis, a first longitudinally adjustable shaft having a first ball pivot formed at one end thereof and having the other end extending through a first opening in said support panel for adjustable movement relative thereto, a second longitudinally adjustable shaft having a second ball pivot formed at one end thereof and having the other end extending through a second opening in said support panel for adjustable movement relative thereto, said first ball member being attached to said lamp body with the center of said first ball member located along said vertical aim axis, said second ball member being attached to said lamp body with the center of said second ball member located along said horizontal axis, each of said first and second longitudinally adjustable shafts being formed with a plurality of axially spaced grooves, and a partially movable finger-operated locking member slidingly carried by said support panel adjacent each of said first and second longitudinally adjustable shafts for engaging said grooves thereon for locking the associated shaft to said support panel after said lamp body is properly adjusted about one of said aim axes.

* * * * *